M. A. SMITH.
MICROMETER GAGE.
APPLICATION FILED MAY 26, 1910.
1,021,384.
Patented Mar. 26, 1912.
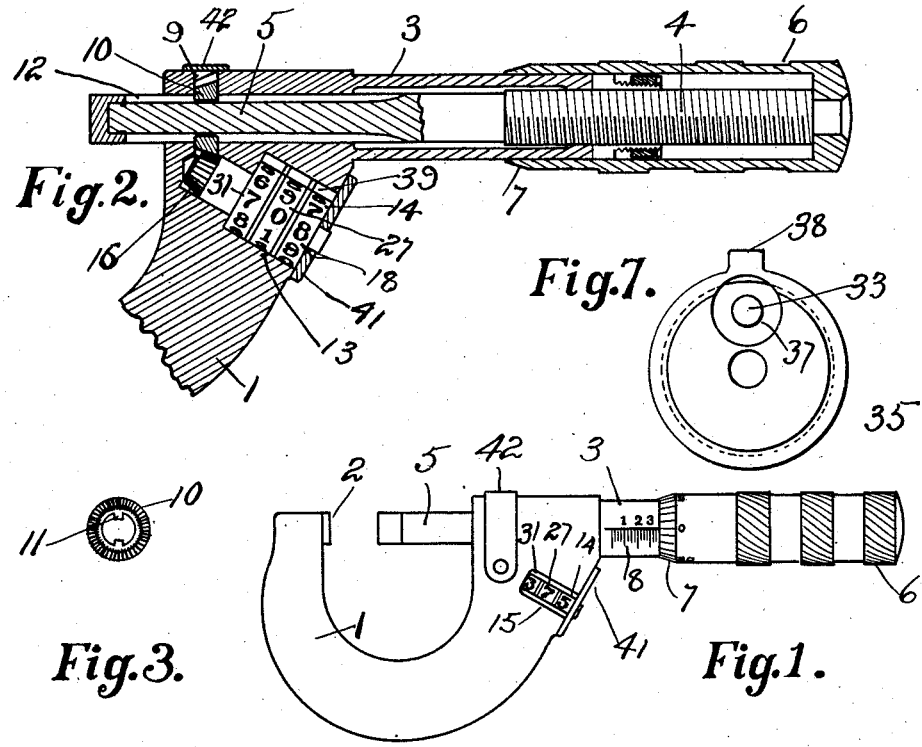
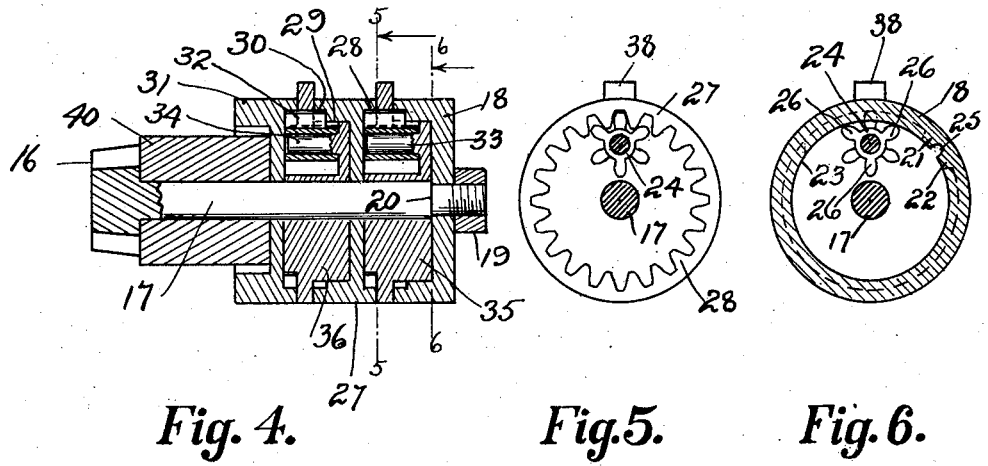
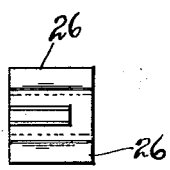
WITNESSES:
John F. Cavanagh
E. J. Ogden
INVENTOR
Milton A. Smith
BY
Howard E. Barlow
ATTORNEY

UNITED STATES PATENT OFFICE.

MILTON A. SMITH, OF WOONSOCKET, RHODE ISLAND.

MICROMETER-GAGE.

1,021,384.   Specification of Letters Patent.   Patented Mar. 26, 1912.

Application filed May 26, 1910. Serial No. 563,498.

*To all whom it may concern:*

Be it known that I, MILTON A. SMITH, a citizen of the United States, residing at the city of Woonsocket, in the county of Providence and State of Rhode Island, have invented certain new and useful Improvements in Micrometer-Gages, of which the following is a specification, reference being had therein to the accompanying drawing.

This invention has reference to a micrometer gage or caliper, and has for its object to provide a gage of this character with means whereby the measurement may be read direct by figures positioned by a counting mechanism.

The ordinary micrometer gage is provided with a graduated barrel over which a coöperating graduated sleeve is designed to work. In reading the micrometric fractions on such a gage errors are frequently made, as the graduations are small and indistinct and the operator in some cases is obliged to perform a mental calculation in order to ascertain the exact reading.

My improved gage is constructed so as to show the measurement by the simplest form of direct reading which indicates tenths, hundredths and thousandths of an inch, or other unit of measurement, so that one unskilled in the use of this gage will have no difficulty in ascertaining at a glance the exact gage or thickness of the article measured.

With these and other objects in view, the invention consists of certain novel features of construction, as will be more fully described and particularly pointed out in the appended claims.

In the accompanying drawings: Figure 1— is a side elevation of my improved micrometer gage showing the direct reading on the yoke. Fig. 2— is an enlarged sectional view through the working parts. Fig. 3— is an end view of the driving gear operated by the spindle. Fig. 4— is an enlarged central section of the counting mechanism and its driving pinion. Fig. 5— is a section on line 5—5 of Fig. 4 showing an end view of one of the counting drums. Fig. 6— is a section on line 6—6 of Fig. 4 looking in the direction of the arrow. Fig. 7— is a face view of one of the counter pinion supporting plates. Fig. 8— is a top view of one of the counter pinions showing the different widths of the teeth.

Referring to the drawings 1 designates the yoke which is made in the usual U-shape or form. The anvil 2 is secured to one end of the yoke and the barrel 3 extends from the opposite end thereof. This barrel is internally screw-threaded and engages with the screw threaded portion 4 of the spindle 5 in the manner usual with micrometer gages of this character. To the threaded end of the spindle is connected the index barrel 6, the same being graduated at its beveled portion 7, see Fig. 1, to coöperate with the graduations 8 on the barrel 3 to obtain the fine readings as is usual in the ordinary micrometer gage, but such graduations are not necessary when my direct reading attachment is applied to this gage. In order to attach my counting mechanism to a gage of this character the yoke is provided with an aperture 9 for the reception of the beveled operating gear 10 which gear is provided with one or more splines 11 adapted to fit into corresponding grooves 12 running lengthwise of the spindle 5 whereby said spindle is adapted to slide back and forth through said gear, which is rotated therewith as said spindle is being moved to the desired position with relation to the anvil 2. The yoke is also recessed at 13 providing an aperture into which the counting mechanism 14 may be set, the same being entirely inclosed with the exception of the opening at 15 through which the direct reading figures may be observed. The counting mechanism is operated by an angularly disposed counter shaft 17 provided with a beveled pinion 16 meshing with gear 10. To the outer end of counter shaft 17 is rigidly secured the counter drum 18 by means of the jam nut 19 binding said drum against the shoulder 20. The periphery of this drum is provided with consecutive numbers from 1 to 10, as shown in Fig. 2. The interior of the drum is provided with two inwardly projecting teeth 21 and 22, see Fig. 6, and an annular guide ring 23 for controlling the rotation of the counting drum operating pinion 24. This pinion is shown as being provided with six teeth every other tooth being longer on its face than the next adjacent tooth, as shown in Fig. 8, whereby these longer teeth 26 are adapted to project outward and engage the internal annular face of the ring 23 to securely retain said pinion against rotation while the counter drum 18 is making another revolution, the space 25 being cut out between said teeth 21 and 22 to receive the extending end of the elongated teeth 26 and permit said gear to rotate two teeth or one-third of a revolution at each revolution of said counting drum 18. The next adjacent counter drum 27 is also numbered on its periphery, see Fig. 2, and is provided at one end with internal teeth at 28, see Figs. 4 and 5, and with a guide ring 29 at its opposite edge having a pair of feed teeth at 30 which are a duplicate of those indicated in Fig. 6 on counter drum 18. The third counter drum 31 is also provided with consecutive numerals from 1 to 10 on its outer surface; and is provided on one edge with internal teeth similar to those illustrated at 28 on drum 27 in Fig. 5.

The pinion 32 is the exact duplicate of pinion 24 illustrated in Figs. 5 and 6. These pinions are mounted on pins 33 and 34 of the plates 35 and 36 respectively, said plates being recessed at 37 (see Fig. 7) to receive said pinions and these plates are also provided with an outwardly extending lug or key 38 adapted to enter a corresponding recess 39 in the frame to hold these supporting members from revolving. The collar 40 forms a bearing for the gear shaft 17, and also serves as a spacer for retaining the rotating members of the counter in position. A plate 41 may be secured in position to the yoke by screws or otherwise for retaining the counting mechanism in position, and a band 42 may be employed for closing the opening 9 in which the gear 10 is located.

In operating my improved gage it is only necessary to rotate the handle or barrel 6 in the usual way to carry the spindle either forward or back for the purpose of engaging the article to be measured, the rotating movement of which is transmitted through the gear 10 to the pinion 16 which in turn rotates the several counting drums in direct proportion to the lead of the actuating micrometer screw, the gear teeth in said counting drums being so arranged that the first drum shall indicate thousandths, the second hundredths and the third tenths of an inch, or other units of measure, whereby the exact measurement may be indicated by direct reading numerals in plain view of the operator so that one unskilled in the use of this instrument can at once obtain an accurate reading of the measurement.

A special advantage of the applicant's structure is such that it permits verification of the reading numerals of the counter by reference to the usual graduations of the micrometer gage type. And the whole device is so practically like the ordinary and most commonly used micrometer gage, that the user does not have to learn any new manipulation of it. He simply uses it in the same way as that to which he has always been accustomed, but the present invention adds to the old type of gage a means whereby reading numerals can be easily inspected. At the same time the user can, if he wishes, rely upon the scale graduations as he has been accustomed to do. But if there is any uncertainty about such graduations due to poor light or anything else, he can refer to the easily read numerals. And, as has been stated, one set of readings can be employed to verify the other.

I do not wish to be restricted to the use of bevel gears for driving my counting mechanism and of setting the axis of the counter on an angle to that of the spindle, as other styles of gears may be used for this purpose, if desired, without departing from the spirit and scope of my invention.

I claim:

1. A micrometer gage comprising a yoke having an internally threaded barrel, a sleeve on said barrel arranged to coöperate with the graduations thereof, a spindle connected to rotate with said sleeve and threaded to coöperate with the internal threads of said barrel, a pinion mounted to rotate with said spindle, said yoke having an opening to receive said pinion and adapted to prevent lateral movement thereof, an angularly arranged counter shaft mounted in said yoke and having a pinion operatively engaged by the first mentioned pinion, and counting mechanism mounted on said shaft and operatively connected therewith.

2. A micrometer gage comprising a yoke having an internally threaded barrel, a sleeve on said barrel arranged to coöperate with the graduations thereof, a spindle connected to rotate with said sleeve and threaded to coöperate with the internal threads of said barrel, a pinion mounted to rotate with said spindle, said yoke having an opening to receive said pinion and adapted to prevent lateral movement thereof, an angularly arranged counter shaft mounted in said yoke and having a pinion operatively engaged by the first mentioned pinion, a counter drum rigidly secured to said counter shaft, additional counter drums loosely mounted on said counter shaft, and means within said drums for controlling the rotation of the loosely mounted drums.

3. A micrometer gage comprising a yoke having an internally threaded barrel, a sleeve on said barrel arranged to coöperate with the graduations thereof, a spindle connected to rotate with said sleeve and threaded to coöperate with the internal threads of said barrel, a pinion mounted to rotate with said spindle, said yoke having an opening to receive said pinion and adapted to prevent lateral movement thereof, an angularly arranged counter shaft mounted in said yoke and having a pinion operatively engaged by the first mentioned pinion, a counter drum rigidly secured to said counter shaft, additional counter drums loosely mounted on said counter shaft, plates within said drums, said plates being provided with means for engaging said yoke to prevent rotation of the former, and pinions carried by said plates and controlling the rotation of said loosely mounted drums.

In testimony wherof I affix my signature in presence of two witnesses.

MILTON A. SMITH.

Witnesses:
 Howard E. Barlow,
 E. I. Ogden.

Copies of this patent may be obtained for five cents each, by addressing the "Commissioner of Patents, Washington, D. C."